United States Patent Office.

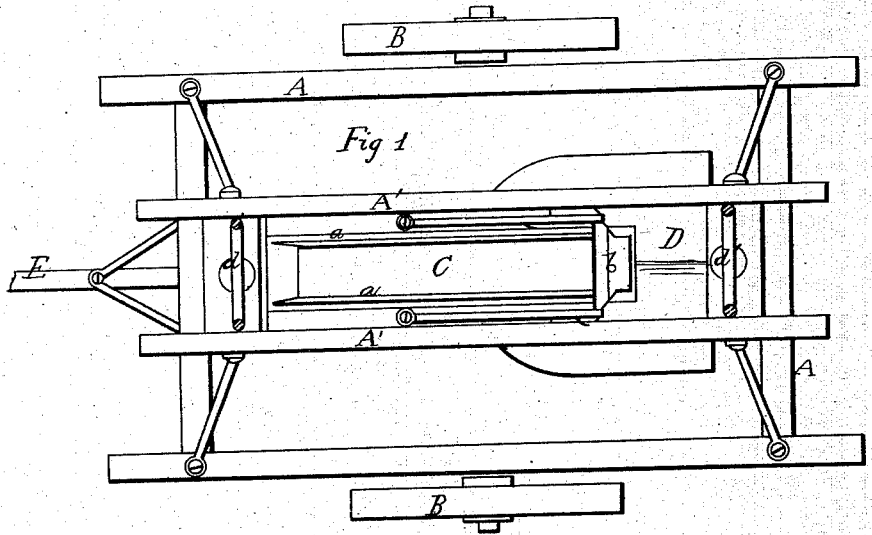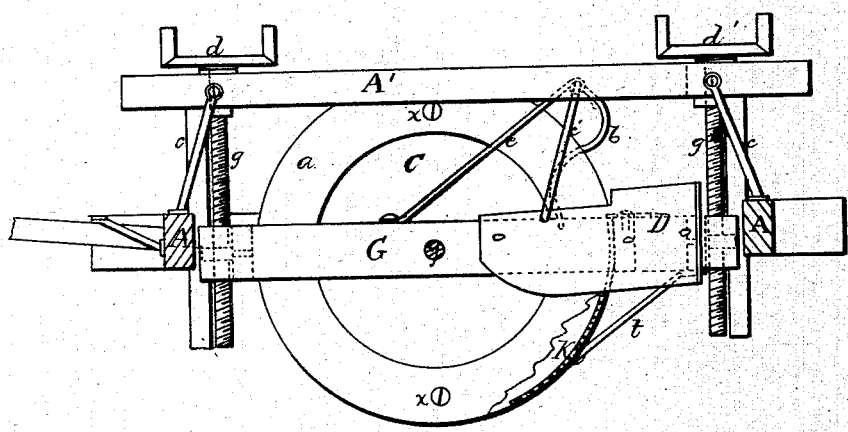

ALFRED GIFFORD AND ISAAC SERIGHT, OF MILROY, INDIANA.

*Letters Patent No. 68,975, dated September 17, 1867.*

IMPROVED DITCHING MACHINE.

*The Schedule referred to in these Letters Patent and making part of the same.*

TO ALL WHOM IT MAY CONCERN:

Be it known that we, ALFRED GIFFORD and ISAAC SERIGHT, of Milroy, in the county of Rush, and in the State of Indiana, have invented new and useful improvement in Ditching Machines; and do hereby declare that the following is a full, clear, and exact description thereof, reference being had to the accompanying drawings and to the letters of reference marked thereon, making a part of this specification.

In the annexed drawings, A represents a suitable frame having wheels B B. Raised above this frame by small standards $c\ c$, is a narrow oblong frame, A', and additionally braced by rods extending from the frame A. Directly under the frame A' is the adjustable frame G, between which is pivoted at $y$, the wheel C, which is provided with the knives and shovel for ditching the earth. Upon each side of the wheel are bolted the circular knives $a\ a$, which extend outside of said wheel, so as to leave a suitable gutter between them and the periphery of the wheel. K represents a curved shovel, which is attached to the top of the frame G in the rear of the wheel C, and lies between the circular knives $a\ a$, with its lower end near the ground. This knife can be adjusted either close to or far from the wheel, by means of a small slot in its upper part, and is kept in its place by a brace, $t$, extending from the frame to its lower extremity. D represents a metallic shield placed upon the frame G in the rear of the knives $a\ a$ upon the wheel C, which is made convex at its top, with its sides extending below the side of the frame for carrying the earth of the ditch. $b$ represents the scraper supported by suitable rods $e\ e'$, with its end resting against the wheel C, between the knives. This scraper catches the earth as it is conveyed up the channel by the knife K, and forces it over the shield D, while keeping the wheel clean at the same time. It will be observed that the frame G carrying the wheel C is adjusted by means of screws $g\ g$ at each end, which have cranks $d\ d'$ at their tops, which rest upon the top of frame A. These screws pass through small metal bars on the ends of the adjustable frame G, and carry the said frame up or down between the uprights $c\ c$ at each end. There are nuts on each screw for holding the frame in the position required. E represents the tongue to which is applied the power. This machine is first regulated by the screws, so that the knives on the wheel may be made to penetrate the earth the required depth. The machine is then drawn and the earth taken up by the knife K, after being cut by the knives $a\ a$, and carried up the channel upon the shield and carried off the sides.

Having thus fully described my invention, what I claim as new, and desire to secure by Letters Patent, is—

The arrangement of the knife K, wheel C with its circular knives, scraper $b$, and horizontal adjustable frame regulated by the screws $g\ g$, and provided with the plate D, when used in the manner and for the purposes herein specified.

In testimony that we claim the foregoing we have hereunto set our hands this 11th day of March, 1867.

ALFRED GIFFORD,
ISAAC SERIGHT.

Witnesses:
C. S. GWINNUP,
MARK C. PERKINS.